Figures 1, 2:
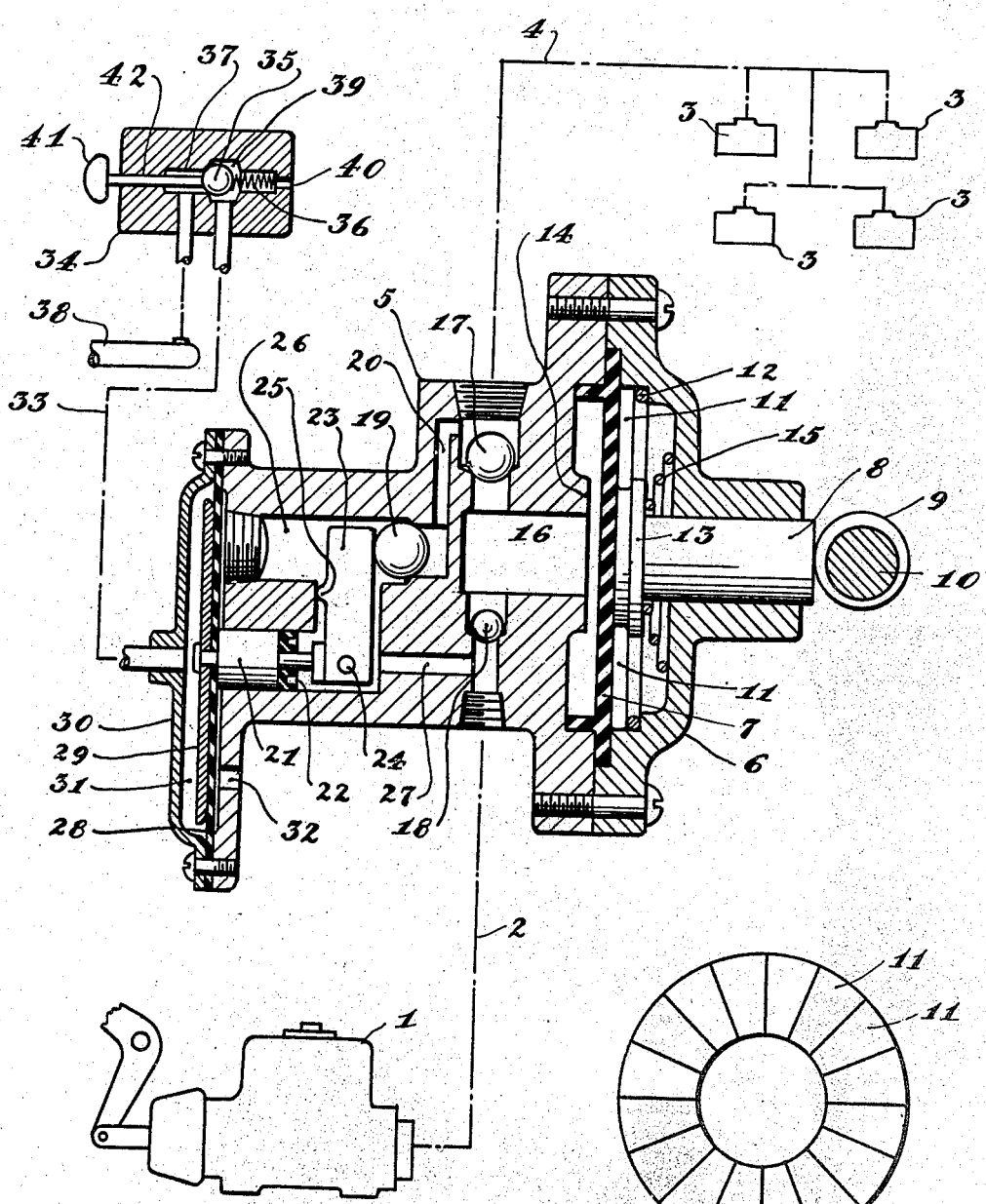

March 19, 1946.   W. STELZER   2,396,897

HYDRAULIC BRAKING SYSTEM

Filed Oct. 7, 1942

INVENTOR.
William Stelzer

Patented Mar. 19, 1946

2,396,897

UNITED STATES PATENT OFFICE 2,396,897

HYDRAULIC BRAKING SYSTEM

William Stelzer, Detroit, Mich.

Application October 7, 1942, Serial No. 461,189

3 Claims. (Cl. 188—152)

The invention relates to hydraulic braking systems and more particularly to a hydraulic brake booster to produce high pressure pulsations transmitted to the wheel cylinders.

It is well known that the use of brakes to stop a vehicle when traction is low is less effective when the brakes are applied with too great a force where the wheels are prevented from turning. Since it is difficult for the operator of a vehicle to judge the maximum amount of pedal pressure without locking the wheels during deceleration, it is my aim to provide a novel booster which prevents locking automatically.

While serving as a power operated booster to lessen the necessary manual effort by the operator, it produces rapid pulsations of higher pressure in the circuit leading to the wheel cylinders. While the pulsations provide an effective brake application, the intermittent periods of low pressure present a definite opportunity where the wheels are allowed to roll and better traction is re-established, the benefit of which reflects itself also during the short period of high pressure.

It is not only the object of this invention to provide a safe and more effective braking system, but also to provide a booster that lessens the effort to be exerted by the operator.

A further object is to produce a simplified system that lends itself for economical manufacture, as the unit may be of very small size without limitation in capacity.

A still further object is to employ a novel modulating valve whereby the magnitude of the pulsations are in a pre-determined proportion to the hydraulic pressure of the master cylinder.

Another feature inherent in the new system is obtained by utilizing the modulating valve, with the aid of a remote control member, for locking the hydraulic brakes in engagement, so that the vehicle may be held with the brake applied even though the operator has released the brake pedal, being particularly useful in starting on a hill.

Other aims and advantages will become apparent by inspection of the drawing, wherein:

Fig. 1 is a sectional side elevation of the novel booster shown connected to a hydraulic braking system which is illustrated diagrammatically, and Fig. 2 is a front view of the novel diaphragm piston consisting of a plurality of segments, shown as arranged in the assembly.

Describing the invention now in detail, there is shown a master cylinder 1 operated by the operator and connected to a hydraulic brake line 2 which is herein referred to as the primary or low pressure circuit. 3 represents the usual wheel cylinders or pressure receiving means for applying the brakes and are connected to brake line 4, herein referred to as the secondary or high pressure circuit. The booster to be described is placed intermediate lines 2 and 4 and consists of a housing or pump body 5 having secured thereto a cover 6 to retain a diaphragm 7 engaged by a piston or plunger 8 actuated by an eccentric 9 driven by a convenient drive shaft 10. The arrangement of this drive shaft is shown only diagrammatically because any suitable driving member may be employed, and is dependent on the type of vehicle on which the brakes are used. Thus 10 may represent a shaft driven by the fan belt of an internal combustion engine, or by its cam shaft, or by a separate motor.

Diaphragm 7 has a backing consisting of a plurality of separate segments 11 illustrated in Fig. 2, resting at their outer periphery against a wire ring 12 seated on cover 6, which provides a suitable pivot on which these segments may oscillate. Segments 11 at their inward periphery rest against shoulder 13 of plunger 8 so that diaphragm 7 is fully backed and at no place is subjected to tensile stresses. Plunger 8 is slidable in the hub of cover 6, and urged against stop 14 of housing 5 by a spring 15 serving to hold plunger 8 out of engagement with cam or eccentric 9 when the brakes are not in use.

Diaphragm 7 serves as a piston of a pump to increase and decrease the volume of chamber 16 which is in communication with the secondary circuit through check valve 17 allowing fluid to pass from chamber 16 to line 4 but not vice versa. Another check valve 18 intermediate line 2 and chamber 16 serves to enable fluid to pass from the primary circuit to chamber 16 but not in the opposite direction.

In order to modulate the pressure in the secondary circuit so that the boosted pressure does not exceed a pre-determined multiple of the pressure in the primary circuit I provide a modulating valve consisting of a valve member or ball 19 exposed on one side to the boosted pressure due to passage 20, and modulating piston 21 having a seal 22 and being connected to a lever 23 at 24 to act against ball 19 to keep the latter seated, 25 being the fulcrum point for lever 23. Chamber 26 is exposed to the pressure of the primary circuit through passage 27.

To maintain a pressure in the secondary circuit a control mechanism is provided consisting of a diaphragm 28 secured to piston 21 with a piston plate 29 and clamped between housing 5 and cylinder 30 forming a chamber 31. The opposite side of the diaphragm is exposed to the atmosphere through hole 32. Cylinder 30 is in communication through line 33 with a control valve 34 having a ball 35 urged by a spring 36 to close off a passage 37 communicating with a source of vacuum such as intake manifold 38. Chamber 39 is shown in communication with the atmosphere through opening 40. Ball 35 is operated by a push button 41 connecting with a push rod 42 slidable in valve housing 34. This valve is manually operable and may be mounted at a convenient place on the instrument panel. It may also be operated automatically in conjunction with other mechanical devices.

Having thus described the novel braking system, I shall now illustrate the operation of the same. While the brakes are released and the hydraulic pressure in master cylinder 1 is relieved, diaphragm 7 is pressed against stop 14 by virtue of spring 15 whereby plunger 8 is out of reach of cam 9 which is rotated continuously.

Assuming that the operator steps on the brake pedal to apply the brakes, a pressure is produced in master cylinder 1 and communicated to chamber 16 as well as the secondary circuit, causing the brake shoes to expand. When the brake shoes are in contact with the brake drums and the resistance is increased with a necessary increase in the primary pressure, spring 15 yields so that plunger 8 comes into contact with eccentric 9 which pushes it back to decrease the volume of chamber 16. The fluid displaced urges check valve 18 to close and passes through check valve 17 into the secondary circuit containing wheel cylinders 3, increasing the pressure therein. Flow of fluid from master cylinder 1 to chamber 16 is momentarily stopped, though the pressure in the master cylinder is maintained. The boosted pressure in line 4 is communicated through passage 20 to act on ball 19 which is lifted when the pressure thereon exceeds the hydraulic pressure of the primary circuit and the action of piston 21 on the other side of said ball. As soon as eccentric 9 has passed the end of its lift plunger or push rod 8 follows it to return due to the primary pressure acting on diaphragm 7, valve 17 being closed again and valve 18 allowing fluid to pass from line 2 into chamber 16. Thus the primary pressure acts to keep push rod 8 permanently in contact with eccentric 9 during a brake application, whereby diaphragm 7 is reciprocated back and forth to act like a pump, the intake taking place through check valve 18 and the exhaust through 17. The segments 11 move in unison with diaphragm 7 and transmit the forces acting on said diaphragm. In order to prevent the formation of a gap between the segments at the end of a stroke, it is imperative that the stroke is very short, necessitating pulsations of higher frequency and of smaller displacement which is a desirable feature.

Check valve 17 has a tendency to maintain the pressure in the secondary circuit and therefore make the pulsations less noticeable, however, due to the lack of resiliency in the system, a minute quantity of fluid added or subtracted from the system has a considerable influence on the hydraulic pressure. Therefore, the very small amount of fluid returned to chamber 16 from line 4 while ball 17 becomes seated after completion of a pumping cycle is sufficient to reduce the pressure in the secondary circuit though it still may be substantially higher than the pressure produced by the master cylinder. The amount of pressure variation can be controlled by selection of valve 17, which is shown diagrammatically. Conventional check valves are known with resilient means for urging the valve member into a seated position, and by using such a valve construction the amount of pressure variation to obtain a pulsating action can be controlled by selection of the resilient means and by governing the lift of the valve member.

Supposing now that the operator applies the brakes, where the booster goes into operation as described hereinbefore, and he wishes to lock the brakes, he depresses push button 41 which urges ball 35 to open passage 37 and to close passage 40 so that the source of vacuum 38 is in communication with chamber 31 through line 33, causing a suction on diaphragm 28 to pull on piston 21, whereby the force is transmitted through the medium of lever 23 to ball 19, urging the latter to remain in a closed position. Thus the fluid in line 4 is prevented from returning to the master cylinder even though the pressure in the latter is relieved. As soon as the operator releases button 41 spring 36 returns ball 35 into the position shown closing off the source of vacuum and admitting air through hole 40 into chamber 31, whereby the pull on piston 21 is eliminated and the fluid from line 4 is permitted to return to master cylinder 1.

During a brake application where the control valve for locking the brakes is not used, any reduction in the pressure produced by the master cylinder results in an immediate release of fluid from the secondary circuit via valve 19 to the primary circuit. If the brake pedal is completely released, the fluid pressure in the master cylinder drops to almost zero, whereby the forces urging ball 19 to remain seated are eliminated and consequently the hydraulic fluid in the secondary circuit has an opportunity to return to the master cylinder very rapidly until the brake shoes are released.

In the aforegoing description I have referred to the novel construction as a brake booster, though it may have the appearance of a power brake. However, due to the rapid action of the booster and a comparatively high speed of rotation of drive shaft 10, the force exerted on diaphragm 7 while fluid is pumped into chamber 16 by the master cylinder tends to accelerate shaft 10 whereby the momentum due to the acceleration is converted again in the return stroke when fluid is pumped from chamber 16 into the secondary circuit. As a result the work performed by master cylinder 1 augments that of the booster.

While I have shown only one embodiment by way of example, it is apparent that the invention may be carried out in ways different from that shown and applied to other hydraulic systems without departing from the scope of the invention, therefore, I do not wish to be limited in the construction or in the application of the invention to the particular embodiment, except by the terms of the appended claims.

I claim:

1. In a hydraulic braking system having a master cylinder operated by the operator, wheel cylinders to apply the brakes, a hydraulic pump chamber, a diaphragm to produce pressure pulsations in said pump chamber, a plurality of segments to back up said diaphragm against the hydraulic pressure in said pump chamber, means to oscillate said segments about their outer periphery whereby said diaphragm remains in contact with said segments to produce said pressure pulsations, fluid pressure transmitting means from said master cylinder to said pressure chamber with a check valve interposed to prevent hydraulic fluid to return from said pressure chamber to said master cylinder through said check valve, fluid pressure transmitting means from said pressure chamber to said wheel cylinders, a check valve to prevent fluid to return from said wheel cylinders to said pressure chamber, and means to enable the return of fluid from said wheel cylinders to said master cylinder when the pressure in said wheel cylinders exceeds a predetermined multiple of the hydraulic pressure in said master cylinder.

2. The construction as claimed in claim 1, where said means to enable the return of fluid from said wheel cylinders to said master cylinder consists of a valve responsive to the hydraulic pressure in said master cylinder.

3. In a hydraulic braking system, a master cylinder to produce a primary pressure, wheel cylinders to apply the brakes, in combination, power operated means to produce hydraulic pulsations, means to transmit said pulsations to said wheel cylinders, said pulsations being of increased pressures, means to modulate the magnitude of said pulsations to limit it to a pressure that is a predetermined multiple of said primary pressure, means to transmit said primary pressure to said wheel cylinders when the magnitude of said pulsations is reduced to less than said primary pressure, means to enable the return of fluid from said wheel cylinders to said master cylinder when the primary pressure is reduced, and means operable by the operator to prevent the return of fluid from said wheel cylinders to said master cylinder.

WILLIAM STELZER.